United States Patent [19]
Malkamaki et al.

[11] Patent Number: 5,563,895
[45] Date of Patent: Oct. 8, 1996

[54] DIGITAL MOBIL E RADIO COMMUNICATION SYSTEM

[75] Inventors: Esa Malkamaki; Pekka Ranta, both of Espoo, Finland

[73] Assignee: Nokia Mobile Phones Ltd., Salo, Finland

[21] Appl. No.: 145,874

[22] Filed: Oct. 29, 1993

[30] Foreign Application Priority Data

Oct. 30, 1992 [FI] Finland ................................ 924943

[51] Int. Cl.⁶ .................................................... H04L 1/16
[52] U.S. Cl. ............................................................. 371/32
[58] Field of Search ................................ 371/31, 32, 33, 371/35; 370/18, 77, 79, 80, 81, 82

[56] References Cited

U.S. PATENT DOCUMENTS

| | | | |
|---|---|---|---|
| 4,672,608 | 6/1987 | Ball et al. | 370/93 |
| 4,688,224 | 8/1987 | Degan et al. | 371/31 |
| 4,841,527 | 6/1989 | Raychaudhuri et al. | 371/32 |
| 4,905,234 | 2/1990 | Childress et al. | 370/94.1 |
| 4,907,277 | 3/1990 | Callens et al. | 381/46 |
| 5,010,553 | 4/1991 | Scheller et al. | 371/35 |
| 5,103,445 | 4/1992 | Östlund | 370/79 |
| 5,168,502 | 12/1992 | Millet | 371/32 |
| 5,210,751 | 5/1993 | Onoe et al. | 370/94.1 |

FOREIGN PATENT DOCUMENTS

0418866A2  3/1991  European Pat. Off. .

OTHER PUBLICATIONS

Finnish Office Action on Patent Application No. 924943 and English Translation thereof dated 26 May 1993.

IEEE International Conference on Communications ICC '83 Jun. 19–22, 1983, Boston, vol. 1, pp. 323–327, IEEE, New York; B. Dorsch; "Successive Check Digits rather than Information Repetition".

IEEE Communications Magazine vol. 22, No. 12, Dec. 1984, Piscataway, NJ pp. 5–17, S. Lin/D. J. Costello/M. J. Miller: "Automatic Repeat Request Error Control Schemes".

R. Steele (ED) "Mobile Radio Communications", Pentech Press, London, 1992.

IEEE Transactions on Communications vol.36, No. 4, Apr. 1988, New York pp. 389–400 J. Hagenauer: "Rate–Compatible Punctured Convolutional Codes (RCPC Codes) and their Applications".

Primary Examiner—Stephen M. Baker
Attorney, Agent, or Firm—Perman & Green

[57] ABSTRACT

A digital mobile radio communication system, in which a burst of speech or data, is transmitted, and an error check is carried out for each burst and when the burst is incorrect, information about the incorrect burst is transmitted to the transmitter. Hereby, the transmitter retransmits the same burst or a burst containing information related thereto, preferably prior to producing a subsequent burst. With the procedure the delay in transmission can be made shorter.

17 Claims, 4 Drawing Sheets

DIGITAL MOBILE RADIO COMMUNICATION SYSTEM

The present invention relates to a digital mobile radio communication system.

BACKGROUND OF THE INVENTION

Blocking of radio phone channels due to increased use of mobile phones presents a problem in the analog NMT system. In digital mobile phone networks the capacity of a network is far greater than that in analog networks, and the channels are able to hold more users. In order to make more efficient use of the channels, development of speech coding methods with below 16 kbit/s transmission speeds should be aimed at. In addition to a low transmission speed, as good speech quality as possible should be achieved, which is expressed to be maintained also in a poor transmission channel, i.e. the data to be transmitted is expected to accept a given amount of bit errors without causing disturbances to the speech. Therefore, methods which are non-sensitive to transmission errors should be used in the coding.

It is important in transmitting speech not to grow the delay excessively. The total delay of a speech connection is allowed to be 300 ms at most in accordance with the CCITT recommendation when a satellite is used in a fixed network connection. If a call selected through a terrestrial radio network is connected in a fixed network via a satellite, said delay requirement restricts greatly the permitted delay of the radio network. In that context reference is made to 20 to 30 ms delay as allowed in the radio network. Meeting a delay requirement of this degree is difficult in conventional error protection methods, such as channel coding and interleaving used in e.g. in the Pan-European GSM radio network.

In digital mobile radio systems, the phones and base stations are provided with a speech coder/decoder (codec), encoding the data to be transmitted and decoding the data to be received. A variety of basic methods of speech coding exist, and in addition, from the basic speech coding methods a plurality of different versions and modifications have been developed. The recommendation of GSM 06.10 determines the implementation of speech coded in the GSM system very precisely up to the bit level. The transmission and reception in the GSM system are described below by referring to FIG. 1 presenting a block diagram of a transceiver of the GSM system. The first phase in a transmission sequence is digitizing 1 and coding 2 of analog speech. The sampling is carried out at 8 kHz frequency, and in the algorithm the input signal is assumed to be 13 bit linear PCM. The samples are segmented into frames of 160 samples, whereby the duration of a frame is 20 ms. In the speech coder of the GSM system, 20 ms speech frames are processed, i.e. prior to starting a coding process, 20 ms of speech is allowed to enter the buffer. The coding operations are carried out frame-specifically or in subframes thereof (in 40 sample blocks). As a result of an encoding process of the encoder 2, one frame yields 260 bits. After the speech encoding 2, a channel coding 3 is accomplished in two steps; first, part of the bits (e.g., 50 of the most significant ones of the 260 bits) are protected with a block code 3a (that is, CRC, 3 bits), and thereafter, these and the second most important bits (132) are protected further with a convolution code 3b (coding ratio 1/2) ((50+3+132+4)*2=387), and part of the bits are taken in unprotected (78). In block coding 3a a bit sequence is added to the end of a speech frame, with which transmission errors can be detected in the reception. In the convolution coding 3b the speech frame redundancy is increased. On the whole, 456 bits per 20 ms frame are thus transmitted. Said 456 bits are interleaved 4 and even said interleaving includes two phases. First 4a, the order of the bits of a frame is mixed and the mixed bits are divided into eight blocks equal in size. The blocks are divided 4b further into eight consecutive TDMA frames, i.e. the interleaved 456 bits are transmitted in eight time intervals of the radio path (57 bits in each). With the aid of interleaving, endeavours are made to distribute the transmission errors, occurring in general in error bursts, uniformly over the entire data to be transmitted, whereby the channel decoding acts most efficiently. After the deinterleaving in the receiver, an error burst becomes individual error bits which can be corrected in channel decoding.

The next step in the transmission sequence is data encryption 5. The encryption 5 is made with an algorithm which is one of the most carefully guarded secrets of the GSM. By means of the encryption, the illegal listening of calls is prevented, which in analog networks is possible. From encrypted data a burst to be transmitted is formed 6 by inserting therein a training sequence, tail bits, and a guard period. The burst to be transmitted is carried to the GSMK modulator 7 which modulates the burst for transmission. The Gaussian Minimum Shift Keying (GSMK)-modulation method is a constant-amplitude digital modulation method in which the information is included in the changes of a phase. A transmitter 8 mixes the modulated burst through one or more intermediate frequencies to 900 megahertz, transmitting it through an antenna to a radio path. The transmitter 8 is one of the three radio frequency blocks RF. The receiver 9 is a first block on the receiver side and performs inverse operations than the transmitter 8. The third RF block is a synthesizer 10 responsible for forming the frequencies. The GSM system uses a frequency hopping, in which the transmission and reception frequencies are exchanged in each TDMA frame. The frequency hopping improves the quality of the connection, while simultaneously setting the synthesizer 10 strict requirements. The synthesizer 10 must be able to shift from one frequency to another in less than a millisecond.

After the receiver 9, operations are carried out which are the reverse of those performed prior to the transmitter 8. By example, after the RF receiver 9 and the demodulator 11, bit detection 12 is carried out, wherein bits are detected in the received samples, i.e. by trying to detect the bit sequence transmitted. After said detection, the decryption 13 and deinterleaving 14 are carried out, and channel decoding 15 is provided for the detected bits, as well as the errors are checked with a cyclic redundancy check (CRC). In the channel decoding 15, endeavours are made to correct the bit errors produced in transmitting the burst. A speech frame of 260 bit size, subsequent to the channel decoding 15, includes the transmitted parameters illustrating the speech, with the aid of which the speech decoding 16 forms a speech signal. The speech signal is D/A converted 17 and carried to the loudspeaker 18 of the receiver.

The transceiver is moreover provided with a control unit 19 to control all blocks and to coordinate their operations, and to control the timing. The control unit 19 includes e.g. a microprocessor.

In the above described GSM system delays are produced in the error protection used first from the 20 ms speech frame (buffering of the incoming speech samples prior to starting speech encoding), from the interleaving about 40 ms, and in addition, delays in the processing (speech encoding, speech decoding, equalizer, channel decoding, etc.). The most significant generator of delays in thus interleaving.

In addition, a data package produced for transmission in e.g. the GSM system is transmitted in several bursts, for which a deinterleaving and channel decoding is carried out in the reception. Thereafter, the entire received data package is examined in case of errors. If the data package contains any errors, information thereabout is transmitted back to the transmitting apparatus, which thereafter transmits the entire data package once again. For this reason, useless extra time and capacity are spent when whole data packages produced from a number of bursts have to be transmitted again to error situations.

The GSM system, which is based on Time-Division Multiple Access, is not described in the present control more in detail, because it is obvious to a person skilled in the art, and the system is defined accurately for instance in the so-called GSM specifications and introduced in e.g. a publication 'M. R. L. Hodges, The GSM radio interface, British Telecom Technological Journal', Vol. 8, No 1, 1990, p. 31–43, the contents whereof being included in the present context as a reference.

SUMMARY OF THE INVENTION

According to a first aspect of the present invention there is provided a digital mobile radio communications system adapted to transmit data signals in bursts the system comprising a transmitter and a receiver, characterized in that the receiver is capable of carrying out an error check after each data burst is received and informing the transmitter if an error has been detected in the data burst, the transmitter being capable of retransmitting an individual data burst or a substantial part thereof if an error has been detected.

According to a second aspect of the present invention there is provided a transceiver of a digital mobile radio communication system comprising a transmitter and a receiver, the transmitter being provided with means for transmitting data in the form of bursts, the receiver being provided with means for receiving the bursts, characterized in that the transceiver comprises means in the receiver for checking each received burst individually and for detecting potential errors in each received burst separately, and the transceiver comprising a buffer for storing speech or data for potential retransmission of an already transmitted burst or at least a part thereof.

In the specification and claims the term data signal is intended to include speech signals.

An advantage of the present invention is the implementation of a mobile radio communications system, preferably a mobile radio communication system based on Time-Division Multiple-Access or on Code-Division Multiple Access (CDMA), in which a retransmission is used as an error protection method, wherewith a delay caused by error protection and consequently, the total delay, can be reduced.

This is possible by employing a rapid error check for each burst, in lieu of employing interleaving and deinterleaving, in order to detect potential incorrect speech frames. After detecting an error in a burst, the reception end informs thereof the transmission end, which after receiving said information transmits the burst once again in the course of the time interval taken by the speech codec for forming a subsequent speech frame, whereby no additional delay is caused by the retransmission. Instead of transmitting an entire burst again, only part thereof, preferably the most important bits, or entirely new data can be transmitted, on the basis whereof the reception end is enabled to form the original burst. As no interleaving is used, no maximum benefit can be derived from the channel coding; consequently, the channel coding can be omitted, whereby also more free capacity is available, though channel coding may also be used in addition to rapid retransmission. If a duration of a TDMA frame is as long as the time taken by the speech codec for forming a speech frame, a speech burst may thus be transmitted again during the same TDMA frame, in the time interval whereof it was initially transmitted. Alternatively, the retransmission of the speech burst can be made during a subsequent TDMA frame, provided that said subsequent TDMA frame can occur within the time period during which the subsequent speech frame is produced in the speech codec. The system in accordance with the invention may be applied, not only in speech transmission, but also in transmitting other data through a radio phone, such as data included in a computer, a telecopying machine or, in the future, data included in a video signal. In addition, retransmission can be used although channel coding and interleaving are also used. Hereby, some benefit is obtained because each burst is examined in separation, and retransmission is used only regarding the bursts in which errors were detected. Hereby, the entire speech or data package composed of a plurality of bursts need not be retransmitted.

In the system in accordance with the invention a rapid ARQ (Automatic Rapid reQuest) of a burst found to be incorrect is used in the radio path, i.e. in the lowest possible level, for transmitting speech or other delay-critical data. With retransmissions a conventional error protection can be replaced, which is typically implemented by means of channel coding and interleaving. The method is particularly well appropriate for a TDMA radio system, but it can also be applied for a CDMA system. In CDMA systems, channel coding and interleaving are also typically used for speech protection. In omitting channel coding and interleaving, capacity is freed for use in retransmissions. Hereby, a CDMA transmission is not, however, any longer continuous but in the course of part of the time no transmissions are carried out, whereby savings are gained in power consumption and at the same time, the average interference level of the one and same channel is reduced. Various embodiments of the mobile radio communication system in accordance with the invention are mainly described below. As an example is speech transmission, though it is to be noted that the method is also applicable for transmitting other data.

Conventionally (e.g. GSM), a speech package produced by a speech codec (in GSM, 20 ms of speech) is divided into several radio path bursts (interleaving), whereby a loss of a burst caused by interferences or fading in the radio path, and a burst of errors caused thereby can be spread, whereby conventional Forward Error Correction codes (FEC) operate most efficiently.

In the system in accordance with the invention, a speech package produced by a speech codec is typically transmitted in one time, i.e. the TDMA system it is transmitted within one TDMA interval in one TDMA frame, and in the CDMA system it can be transmitted as soon as the speech codec has coded a speech frame of a desired length, and a speech burst to be transmitted has been produced. Hereby, transmission is carried on for a short period of time, and part of the time nothing is transmitted, while a subsequent speech burst is being produced, and CDMA transmission is therefore not continuous. A delay caused by interleaving can be avoided therethrough. A speech burst typically includes an error check for detecting incorrect bursts, such as CRC, which is an error detection system in which parity bits are generated by encoding, and errors producing during the transmission are detected by means of a decoding algorithm. When the receiver detects an incorrect speech package, it sends a request for a retransmission. In order not to cause more delays by the retransmission, it should be carried out during the period of time during which the speech codec forms a subsequent speech package, i.e. prior to transmitting a subsequent speech package, whereby no extra delays are caused by the retransmission. In case the retransmission is not successful, either, that is, the package cannot be carried through without errors, the package is deemed to be lost and the actions follow the procedure which is dependent on the speech codec (e.g. the preceding speech package is repeated). The performed retransmission will thus not cause delays in transmitting incoming speech packages, as is normal with retransmissions, when no additional capacity is provided separately for retransmissions. An essential feature in the method of the invention is furthermore that the receiver end makes a rapid check about retransmission need and informs the transmission end thereof, and that the TDMA frame contains space, that is, free capacity for retransmissions. A response (=request for transmission) can typically be transmitted along with a standard speech package of reverse direction, or alternatively, with response packages reserved for said purpose (such as acknowledgement packages). The retransmission capacity can be fixedly reserved for a user or, more preferably, be common to a number of users because, in any case, every package is not retransmitted. In the latter instance, there may arise a competitive situation between several users because of which a retransmission is not always successful. Measures like those above, in conjunction with unsuccessful retransmission, are taken, as an example a preceding speech package is repeated.

An advantage of the system in accordance with the invention is a small total delay to be achieved when the delay caused by interleaving is omitted. Capacity may likewise be spared when the Forward Error Correction (FEC) can be reduced. (When a speech package is typically transmitted in one radio path burst, there is hardly any use of the heavy error correction coding because the interburst interleaving cannot be used, i.e. the error bursts cannot be disintegrated.) The capacity saving thus obtained may be used for retransmission or for serving new users.

BRIEF DESCRIPTION OF THE DRAWINGS

An embodiment of the present invention is described below, by way of example, with reference to the accompanying drawings, in which.

DETAILED DESCRIPTION OF THE INVENTION

Figure 1:
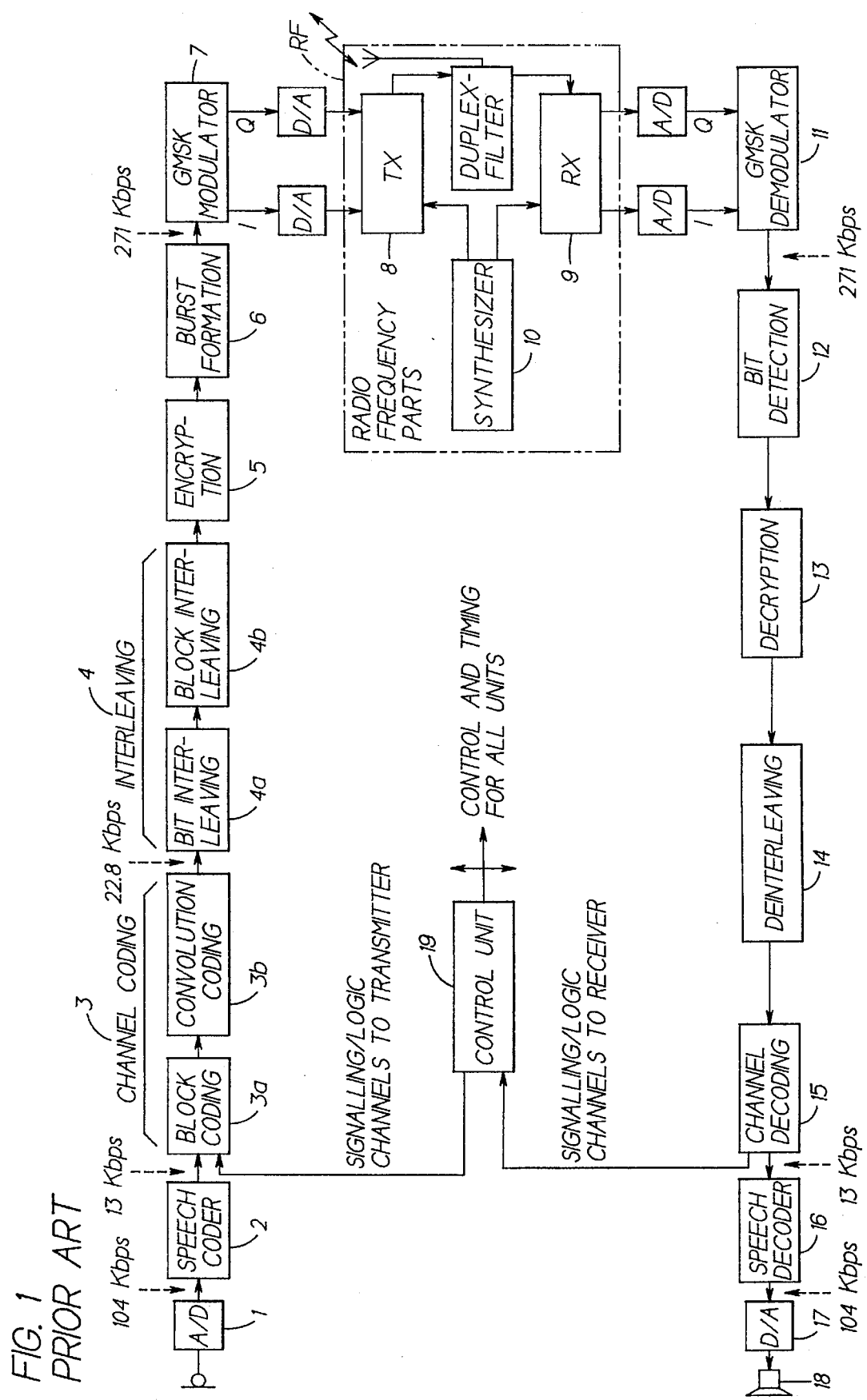
FIG. 1 presents a block diagram of a GSM transceiver.
Figure 2:
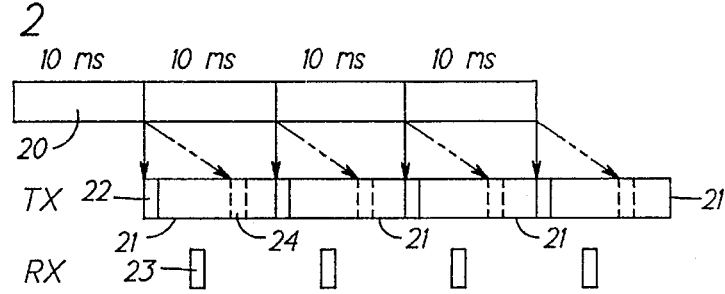
FIG. 2 presents operation in a transceiver channel in the method in accordance with the invention.

FIG. 1 is described above in association with GSM, and the invention is described below by referring primarily to FIGS. 2 to 4. FIG. 2 shows by way of an example the operation in accordance with the invention in a transmission and reception channel. In the instance shown in FIG. 2 is assumed that the speech frame and the TDMA frame are substantially of equal length. In such case the transmission and retransmission are carried out during one and same TDMA frame. It is assumed that the figure presents traffic from a mobile station to a base station (up-link). The mobile station transmits a message as soon as it has completed its coding (speech coding). The base station acknowledges the speech package received in association with a normal transmission taking place from the base station to the mobile station. If the acknowledgement is negative, i.e. the speech package received in the base station is incorrect, the mobile station retransmits it during the same TDMA frame. It can be seen in FIG. 2 that if speech packages of 10 ms length are used (speech is gathered for a 10 ms period prior to processing), the total amount of speech delayed is 20 ms at most, and moreover, additional processing delay is caused by speech encoding, a speech decoding, equalizing, etc. The coded speech data produced by the speech codec is transmitted in a short TDMA burst 22, for instance at the beginning of a TDMA frame 21. Simultaneously with a transmission of the TDMA frame 21, a subsequent 10 ms speech package 20 is read into the codec. For instance, when a base station receives a TDMA burst 22 containing transmitted speech data, it makes a quick error check, transmitting directly thereafter a response in a burst 23 to a transmitter (here, a mobile station) if the speech package was incorrect. The response burst 23 may be a standard burst containing a speech package of reverse direction, or alternatively, a separate response burst reserved specifically for said purpose. Thereafter, the transmitter (mobile station) transmits the same speech package once again in a burst 24 during the same TDMA frame.

In an equivalent situation using 5 ms speech packages in 20 and 5 ms TDMA frames 21, whereby it would be desirable for a real time implementation to have also the other processing delays in 5 ms, the total delay would be 5 ms+5 ms+5 ms. However, a short length of a speech package leads in general to a less efficient channel use when the relative proportion of the extra bits increases because in a radio path additional bits, such as a training sequence, have to be included in a burst, and therefore, if a speech package is excessively reduced, the proportion of data bits relative to the compulsory bits, such as training sequence, remains small and the use of the channel is for that reason inefficient. The invention is not, however, restricted to a given speech frame length because the length of an optimal speech frame is dependent on the application and on other specification of the mobile radio communication system.

Retransmission 24 is performed preferably at a frequency other than the first transmission, whereby the error probabilities of the bursts are uncontrolled. At low speeds of the mobile station, without a frequency hopping, the error probabilities of the bursts would correlate and the transmission of a package, which has been lost because of fading, would not, at a great probability, be successful.

Depending on the application, it pays to protect a speech package lightly, e.g. with a block code which is capable of correcting a few of the errors in addition to its sufficient error detection capability. In such case, there would be no need to retransmit packages containing only a few errors. The amount of block coding could be changeable, this being also dependent on the quality of the channel. Typically, a speech package contains bits of unequal importance, as an example GSM speech packages. The block code can be used only for, by example, protection and error checking of the most important bits. Errors contained in less significant bits will thus not lead to retransmissions. A retransmission may use a different block code (being typically more efficient), whereby more transmission capacity (that is, a longer TDMA burst or 2 TDMA bursts) may be needed for a retransmission, or only the important bits in a well protected form can be repeated. Retransmission can thus be optimized to comply advantageously with the speech coding method. A light channel coding can be implemented also using other coding methods, by e.g. convolutional code. Even in such instance, a separate error detection method, e.g. CRC sum, is required.

Coded modulation, e.g. trellis-coded modulation, can be used in transmission. A majority of the bursts are then typically transmitted with out errors, and the errors become accumulated in a fewer bursts. This would lessen a need for retransmissions.

The additional capacity required in retransmissions can be reserved fixedly for a given user, so that a retransmission is always possible. When no retransmission is needed, the burst remains unused, so that the average interference level is lowered. The additional capacity thus left unused may be delivered to other uses, (e.g. for transmitting no-delay-critical data). With conventional FEC, said extra capacity (i.e. additional bits caused by FEC) is used in any case, irrespective of the fact whether the channel quality is good or bad.

Benefit is most advantageously derived from the system of the present invention when no fixed retransmission capacity is reserved, but when each user needing retransmission reserves additional capacity among those time slots that are free, making e.g. use of a packet protocol. E.g. a slotted Aloha protocol could be used, whereby each user has a chance to try a retransmission in any free time interval. This procedure may result in some lost retransmission packages when an great number of users make an attempt to use the same time slot at the same time. On the other hand, a greater amount of users can be included within the system when the fixed part of the capacity need not be reserved for retransmissions. Similarly, by utilizing the voice activity detection (VAD), more capacity can be provided for flexible retransmissions and for new users. Utilizing the VAD is based on the idea that the channel is released to be used by other users when one is no longer using it. The released capacity can be used for creating new connections because it is not probable that all users are speaking at the same time, neither would all of them have any need for simultaneous retransmissions. A flexible radio path reservation system is nevertheless required, e.g. Packet Reservation Multiple Access (PRMA). By utilizing the statistics of VAD and the package retransmission need, a greater number of logical connections can be implemented without increasing the number of physical channels. In other words, for instance in a conventional TDMA system in which one carrier is provided with e.g. 20 time slots (that is, 20 physical channels), 20 logical connections can be implemented. Using PRMA in the same 20 physical channels, more than 20 logical connections can be implemented (e.g. more than 20 calls can be simultaneously in operation although not more than 20 physical channels are available). Thus, when some capacity is available in all channels and because the free time in different channels and the time when a channel is engaged is rather uniformly distributed, a greater number of logical connections can be realized than the number of the existing physical channels in a system.

Figure 3:
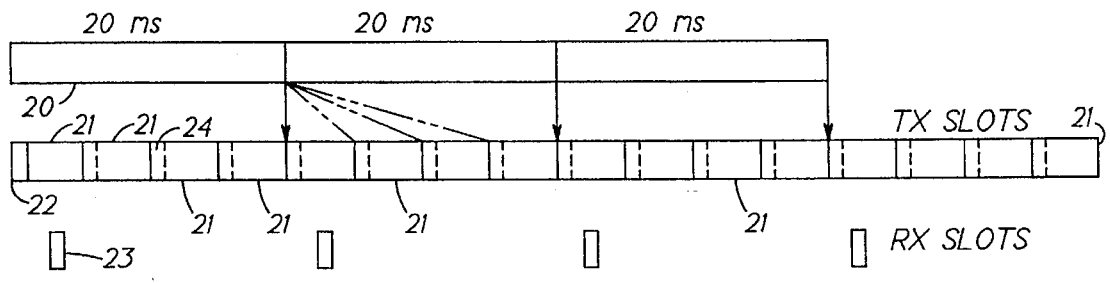
FIG. 3 presents a second example of operation in a transceiver channel in the method in accordance with the invention.

FIG. 3 presents a second embodiment alternative concerning the functioning of the method of the invention in a transmission and reception channel when a 20 ms speech frame 20 and 5 ms TDMA frames 21 are used. (In the situation shown in FIG. 3 one user employs a time interval only from every fourth TDMA frame. The situation is in principle the same as if in using a 20 ms TDMA frame divided into four logical parts.) When there are only few users, time slots can be reserved fixedly for retransmissions 24 for each user from the TDMA frames 21 subsequent to the actual transmission, whereby, when speech is taken in into the codec e.g. in 20 ms frames 20 and when e.g. a 5 ms TDMA frame 21 is used for transmission, the speech data 22 may have even three possibilities available for retransmission 24. As then umber of users increases, time slots are released for new users, whereby possibilities of repetition are reduced. From the TDMA frame 21, also particular time slots can be reserved for retransmissions of all users. The users compete now on the use of a time slot, which may cause, as mentioned above, collisions when two or more users try to make a retransmission at the same time. As in accordance with the example presented in FIG. 3, a retransmission need not be carried out during one and same TDMA frame but e.g. in the course of a subsequent frame. Then e.g. a frequency hopping can be implemented on a TDMA frame basis. It is assumed in FIG. 3 that the normal transmission and reception are carried out in the course of one and same TDMA frame, whereby the acknowledgement of the communication direction shown in the figure can be transmitted along with a normal traffic channel. Acknowledgement of the reverse direction would, however, take too long in the instance of FIG. 3, so that a separate acknowledgement channel would be needed for the other direction (e.g. a given time slot).

Figure 4:
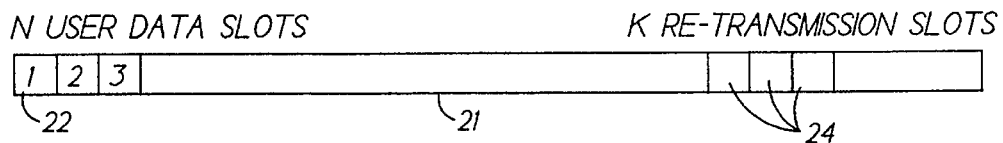
FIG. 4 presents a TDMA frame used as an example in the present invention.

FIG. 4 presents a potential TDMA frame 21 for use in the system of the present invention, in which some of the time slots have been reserved for the actual transmissions 22 and others for retransmissions 24. If needed, the number of time slots reserved for various purposes can be changed. And if needed, also some of the time slots of a frame may be reserved for acknowledgement of the opposite direction, i.e. for retransmission requests.

Figure 5:
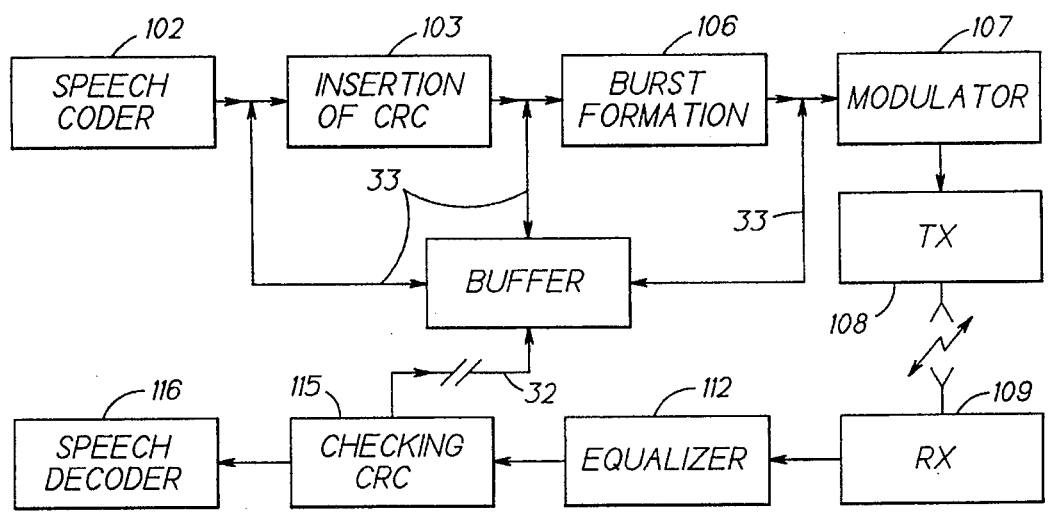
FIG. 5 presents a rough block diagram of a transmitter and receiver used in the system in accordance with the invention.

FIG. 5 presents a principle block diagram of a transceiver used in the system of the present invention. A difference in the transmission sequence compared with the GSM system lies therein that the interleaving block has been omitted. The block diagram presented in this context is considerably simplified in comparison with FIG. 1, and only the blocks essential with a view to the invention are presented. The blocks shown in the block diagram are provided with different reference numerals than the blocks of the GSM transceiver in FIG. 1 because, although some of the blocks might be almost identical with the blocks used in the GSM transceiver, part of said blocks can be different (e.g. the modulator need not be a GSMK modulator). FIG. 5 shows first a speech coder 102 (e.g. part of the codec) which produces a speech frame, and through which other data potentially transmitted will not pass. After producing a speech frame a speech burst (or other data burst) can be produced 106 which is modulated 107 and transmitted 108. As described above, prior to burst formation 106 at least a block coding 103 can moreover be carried out for the speech frame (as part of the channel coding 103), so that bursts with a few errors need not be retransmitted. If considered necessary, a convolution coding 103 can also be performed by block 103. For implementing the invention, a buffer 30 is also needed in the transmission sequence to store the speech frame 33 obtained either from the speech coder 102 or the speech frame 33 added with CRC 103, or a speech burst 33 which has been produced 106. A speech burst 33 to be retransmitted is now obtained from the buffer 30, and it is supplied either to a modulator 107, to the burst producing burst 106, or to a channel coder 103, being dependent on the form it was stored in the buffer 30 because the measures to be carried out will be dependent thereon before a retransmission. As in a transceiver in accordance with the GSM system, in a transceiver used in the mobile radio communication system in accordance with the present invention, a control unit controlling the operations is also needed (not shown). In the reception sequence an equalizer 112, check of CRC 115 and decoding of the signal (voice decoding) 116 into a voice signal are carried out in the received signal 209. If the CRC checking block 115 detects bit errors in the transmitted burst, the apparatus which transmitted the burst will be informed of the error found therein, whereby the burst can be retransmitted on the basis of the burst or frame stored in the buffer. The situation is illustrated with line 32. Between the CRC checking block 115 and the buffer 30 no fixed connection exists, but reference numeral 32 describes that when the CRC formation block detects an error, information thereabout is transmitted to the apparatus which transmitted the burst. In each apparatus (i.e. in the transmitting and receiving apparatus) the functions are controlled by the control unit.

Figure 8A:
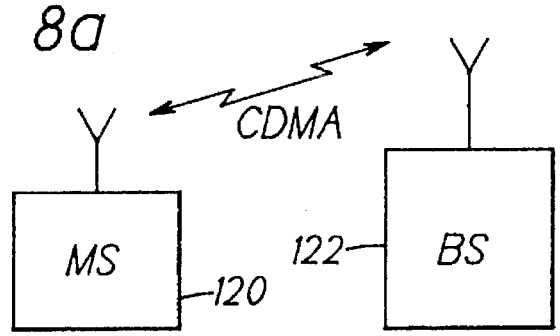
FIG. 8a is a block diagram of a CDMA embodiment of the invention.

Reference can also be had to FIG. 8a for illustrating a CDMA embodiment of the invention, wherein a mobile station (MS) 120 is bidirectionally coupled to a base station (BS) 122. The MS 120 and BS 122 communicate through an RF link wherein information, such as speech and signalling information, is transmitted in a discontinuous CDMA format, as was described earlier.

A retransmission 24 in accordance with the invention is carried out preferably using a different antenna (antenna diversity) (either in transmission or in reception, or in both) than in a first transmission, whereby the error probabilities of the bursts are non-correlating. The diversity can be used instead of frequency hopping in transmitter block 108, or in addition thereto.

Figure 8B:
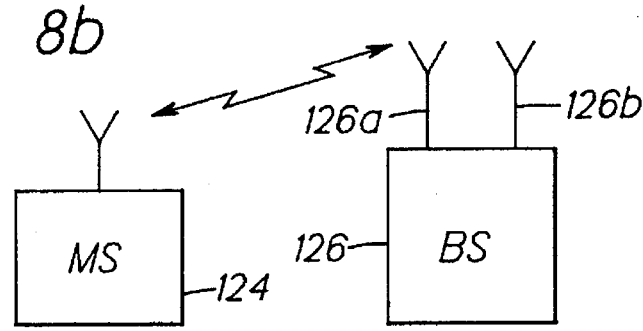
FIG. 8b is a block diagram of an antenna diversity embodiment of this invention.

Reference can also be had to FIG. 8b for illustrating such an antenna diversity embodiment of the invention, wherein a mobile station (MS) 124 is bidirectionally coupled to a base station (BS) 126. The MS 120 and BS 122 communicate through an RF link. In this embodiment the BS 126 includes at least two antennas 126a and 126b for reducing a correlation between burst error probabilities.

In the Finnish patent application FI-922938, a method is disclosed in which a mobile station is connected with two or more base stations at the same time. Hereby, a retransmission may be carried out through a different base station than the original transmission.

Figure 9:
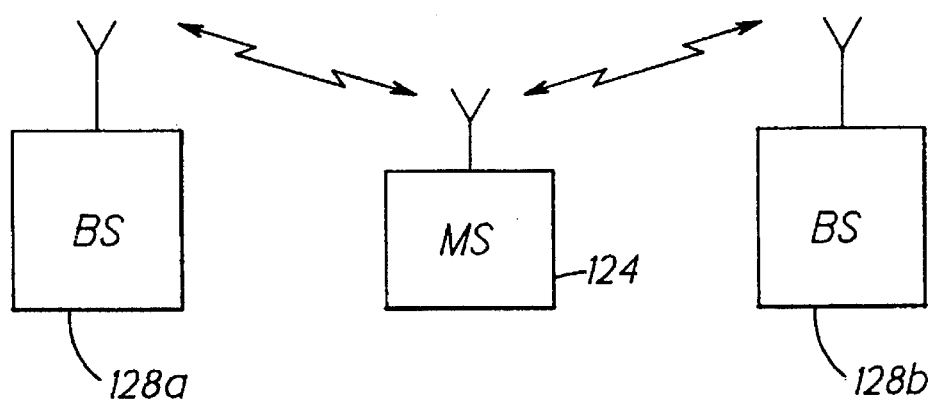
FIG. 9 is a diagram of two base stations and a mobile station in accordance with an embodiment of this invention.

FIG. 9 illustrates this embodiment of the invention, wherein a first base station (BS) 128a, a second base station (BS) 128b, and the mobile station (MS) 124 are shown.

Retransmission does not necessarily mean transmitting the same data again. As already stated above, only the most significant bits can be transmitted again in a better protected form (more channel coding). Alternatively, speech or data without protection can be transmitted first (only containing an error check). If errors are detected, the redundancy bits produced in the channel coding of the original data are transmitted in a second transmission (e.g. coding rate ½, whereby an equal number of redundancy bits as of original data bits are produced) together with the error check. If these are received without errors, the original data can be calculated from said redundancy bits in the reception (inversion). If the retransmission also includes errors, the bursts are combined, whereby a coded block e.g. at coding rate ½, is produced which is decoded (whereby part of the errors can be corrected).

A speech package can be divided into two parts: the important bits and the less important bits. Normally, the important bits are transmitted first in one burst and the less important bits in a second burst. However, if errors are detected in the first burst (in the important bits), the important bits are retransmitted in the second burst instead of the less important bits (or, as described above, the redundancy bits produced in the channel coding). Hereby, transmitting a speech package requires use of at least two bursts, whereby when a channel is of a good quality, both the important and the less important bits are transmitted, and when the channel is poor in quality, only the important bits are transmitted. The quality of the speech varies in accordance with the quality of the channel while the intelligibility of the speech can be guaranteed.

Figure 6:
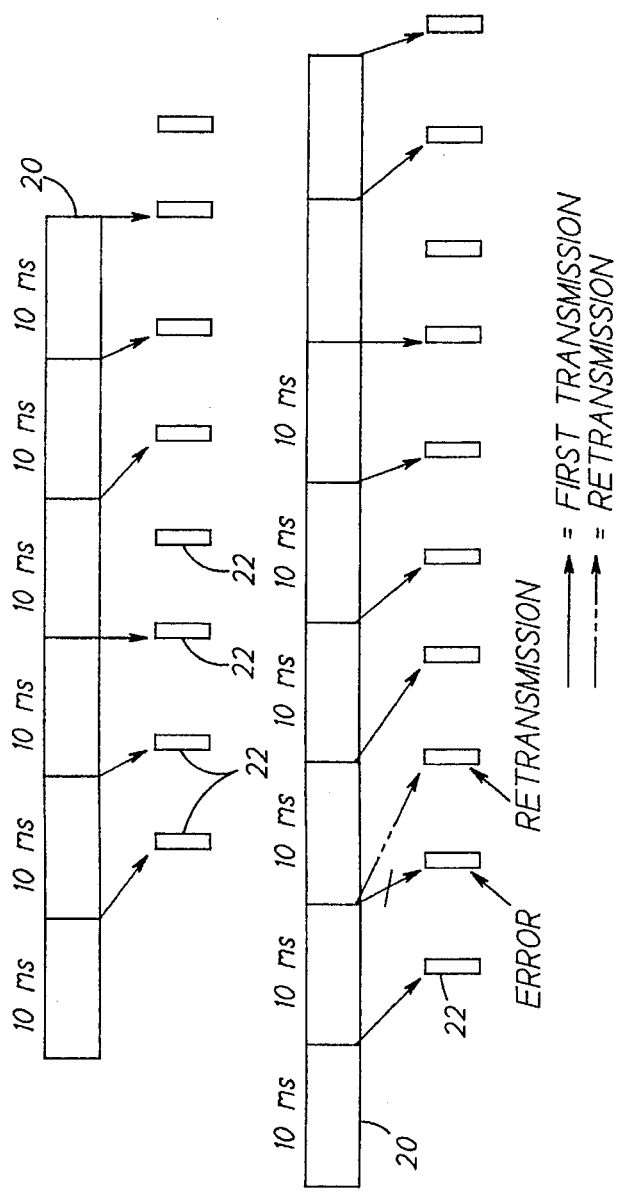
FIG. 6 presents a conceivable embodiment of the invention.

One of the alternatives for implementing the invention is that for transmitting N bursts, where N is a positive integer, M TDMA frames are reserved, so that M is an integer greater than N; whereby, if errors occur in a transmitted burst, it is retransmitted immediately in the next TDMA frame, if an extra free frame is available. This kind of situation is described in, by example, FIG. 6. Four TDMA bursts 22 (and TDMA frames 21) are reserved therein for transmitting three speech packages. In the example, the length of speech frame 20 is 10 ms, and the length of a TDMA frame 21 is 7.5 ms, so that a first burst is not transmitted until after an appropriate period of time when a second burst is already being started to be produced, as can be seen in the figure. If no errors occur, three speech packages 20 are transmitted in the first three bursts 22, and the fourth 22' burst remains untransmitted (or it can be released for other use). However, if errors occur in transmitting a speech package 20, mid speech package 20 can be retransmitted in the next burst 22, and respectively, the transmission of the potential subsequent speech packages can be respectively delayed. In the arrangement as shown in the figure the three speech packages have one chance of retransmission (that is, one of the three can be repeated, if necessary). An advantage of the arrangement lies therein that the capacity for retransmission needs not to be reserved separately. On the other hand, the arrangement restricts the retransmission chances. The above numbers (i.e. a transmission of three speech packages using four bursts) need not be fixed, instead, five or six bursts can be used for transmitting four speech packages, etc. All combinations are in principle possible. The transmission configuration can also be changed adaptively to conform to the quality of the channel so that in a good-quality channel a small amount of the retransmission capacity is reserved, and more capacity in a poor-quality channel. Hereby, the TDMA frame is preferably kept equal in length, and the length of a speech frame is changed in order to produce a desired speech package to burst ratio.

Figure 7:
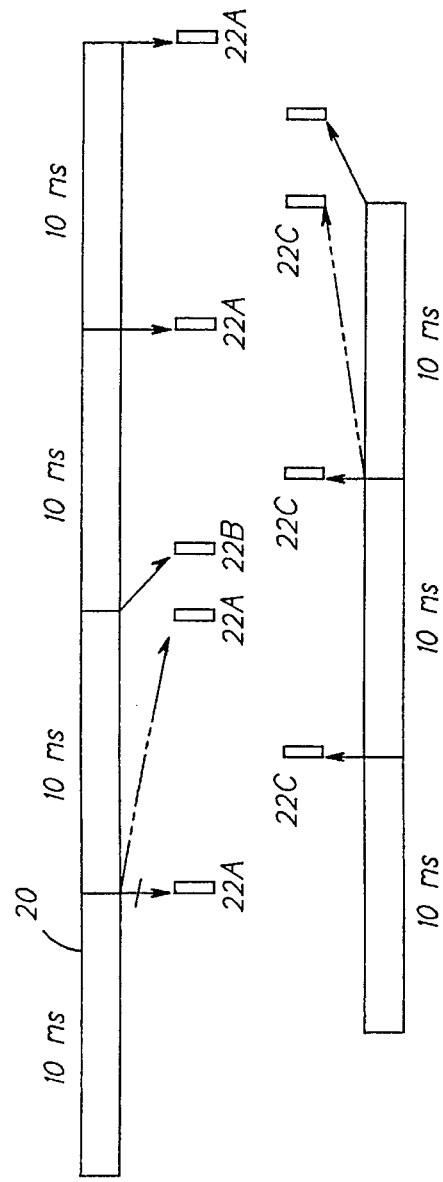
FIG. 7 presents a second conceivable embodiment of the invention.

One more possibility of implementing the invention is presented in FIG. 7. Therein, a speech frame 20 (e.g. 10 ms) is coded and transmitted in a burst 22A. The receiver end checks if any errors are produced in the transmission and informs the transmission end of the errors (either together with a normal reverse direction burst 22C or with a separate response burst). The transmission end retransmits, if needed, the burst in the next ordinary time slot (burst 22A) (i.e. in the next TDMA frame), whereby the speech package intended to be transmitted in said burst moves to be transmitted in an additional burst 22B reserved for said purpose. An advantage of the arrangement is that more time is provided for acknowledgement since a retransmission need not be carried out before the next ordinary transmission. An advantage is also that a normal burst 22C of the opposite direction can be used for acknowledgement, with the provision that the bursts of different directions have been appropriately synchronized. A drawback is that there is always time to acknowledge the additional burst 22B (being the first transmission of the subsequent speech package), whereby no possibility for retransmission exists for that. This means that if errors are produced in the first transmission of two speech packages, it is only the first one which can be retransmitted, that is, for two consecutive speech packages one retransmission possibility exists. However, if the additional burst 22C is transmitted sufficiently early prior to an ordinary transmission 22C of the reverse direction, it can be confirmed in said trans-mission 22C, and respectively, if needed, be retransmitted in a subsequent ordinary burst 22A.

In any instance presented above, a maximum ratio combining can be used if the first and second transmission are the same burst. If the second transmission is not without errors, too, both of the received bursts are taken, these being preferably detected using soft decision detection, and combined using the maximum ratio combining. After said combining, a check is made if a burst thus obtained is without errors.

In view of the foregoing it will be clear to a person skilled in the art that modifications may be incorporated without departing from the present invention.

What we claim is:

1. A digital mobile radio communications system adapted to transmit data signals in bursts, the system comprising a transmitter and a receiver, characterized in that the receiver comprises means for carrying out an error check for received ones of the succession of bursts individually and for informing the transmitter if an error has been detected in any of the received ones of the succession of bursts, the transmitter being responsive to a receipt of an indication that a last-transmitted data burst was received in error for retransmitting at least a portion of the data burst that was received in error;

wherein a data burst to be transmitted is produced from at least one of a speech frame and a data package of a predetermined length; and wherein notification that an incorrect data burst has been received is transmitted to the transmitter by the receiver within a predetermined time after the data burst is transmitted, said predetermined time being the length of said one of a speech frame and a data package.

2. A system as claimed in claim 1, wherein a retransmitted data burst is substantially identical to an originally transmitted burst.

3. A system as claimed in claim 1, wherein a retransmitted data burst contains the most important bits of the data burst that was originally transmitted.

4. A system as claimed in claim 1, wherein Time-Division Multiple Access (TDMA) is utilized to transmit the data bursts.

5. A system as claimed in claim 1, wherein Code-Division Multiple Access (CDMA) is utilized to transmit the data bursts.

6. A system as claimed in claim 1, wherein the error check carried out by the receiver is based on cyclic redundancy checking (CRC).

7. A system as claimed in claim 1, wherein the transmitter transmits a data burst using a first frequency, and retransmits at least a portion of a data burst using a second frequency.

8. A system as claimed in claim 1, wherein the transmitter transmits a data burst using a first antenna, and retransmits at least a portion of a data burst using a second antenna.

9. A system as claimed in claim 1, wherein the transmitter is located at a first base station, and wherein at least a portion of a data burst is retransmitted using a second base station.

10. A system as set forth in claim 1, wherein the transmitter includes means for spreading the burst prior to transmission, and wherein the receiver includes means for despreading the received data burst prior to checking the received data burst for errors.

11. A digital mobile radio communications system adapted to transmit data signals in bursts, the system comprising a transmitter and a receiver, characterized in that the receiver comprises means for carrying out an error check after each data burst is received and for informing the transmitter if an error has been detected in any of said each data burst received, the transmitter being responsive to a receipt of an indication that a last-transmitted data burst was received in error for retransmitting at least a portion of the data burst that was received in error;

wherein two data bursts are automatically transmitted so that in the first burst the most important bits of one of an original speech frame and data package are transmitted, and in the second burst, the following are transmitted:

the less important bits of the one of the speech frame and data package if no errors were detected in the first burst, and the most important bits of the one of the speech frame and data package if errors were detected in the first burst.

12. A digital mobile radio communications system, comprising:

a source of transmitted bursts conveying non-interleaved, error-protected encoded frames of speech, said source comprising means for encoding successive ones of frames of speech, each of predetermined duration, and for error protecting and transmitting individual noes of the encoded frames at the completion of encoding and before a next frame of speech is completely encoded; and a consumer of said transmitted bursts conveying non-interleaved, error-protected encoded frames of speech;

said consumer comprises means for determining if a first received burst was received with at least one error, and for transmitting a message to said source for indicating that said first received burst was received with at least one error, the message being transmitted before a completion of the encoding of the next frame of speech by said source; and said source being responsive to said message for retransmitting during a next, second burst at least a portion of said encoded frame of speech that was received with at least one error.

13. A system as set forth in claim 12, wherein said source error protects said encoded frame of speech of said first burst using a first error protection technique, and error protects at least a portion of said retransmitted encoded frame of speech of said second burst using a second error protection technique.

14. A system as set forth in claim 12, wherein said source transmits said encoded frame of speech of said first burst using a first frequency, and retransmits said retransmitted encoded frame of speech of said second burst using a second frequency.

15. A system as set forth in claim 12, wherein said source transmits said encoded frame of speech of said first burst using a first antenna, and retransmits said retransmitted encoded frame of speech of said second burst using a second antenna.

16. A system as set forth in claim 12, wherein said source transmits said encoded frame of speech of said first burst using a first transmitter, and retransmits said retransmitted encoded frame of speech of said second burst using a second transmitter.

17. A system as set forth in claim 12, wherein said source transmits said encoded frame of speech of said first burst using at least one of a time division, multiple access technique, and a code division, multiple access technique.

* * * * *